United States Patent [19]

Mueller

[11] Patent Number: 5,285,522

[45] Date of Patent: Feb. 8, 1994

[54] NEURAL NETWORKS FOR ACOUSTICAL PATTERN RECOGNITION

[75] Inventor: Paul H. Mueller, King of Prussia, Pa.

[73] Assignee: The Trustees of The University of Pennsylvania, Philadelphia, Pa.

[21] Appl. No.: 773,193

[22] Filed: Oct. 8, 1991

Related U.S. Application Data

[63] Continuation-in-part of Ser. No. 428,455, Oct. 30, 1989, abandoned, which is a continuation of Ser. No. 128,321, Dec. 3, 1987, abandoned.

[51] Int. Cl.$^5$ .............................................. G10L 9/02
[52] U.S. Cl. .................................................. 395/2.41
[58] Field of Search ............................. 395/2.41, 24; 381/41–45

[56] References Cited

U.S. PATENT DOCUMENTS

| | | | |
|---|---|---|---|
| 3,950,733 | 4/1976 | Cooper et al. | 340/172.5 |
| 4,450,530 | 5/1984 | Llines et al. | 364/513 |
| 4,660,166 | 4/1987 | Hopfield | 364/807 |
| 4,760,604 | 7/1988 | Cooper et al. | 382/15 |
| 4,773,024 | 9/1988 | Faggin et al. | 364/513 |
| 4,774,677 | 9/1988 | Buckley | 364/513 |

OTHER PUBLICATIONS

Mueller et al., "General Principles of Operations in Neuron Nets with Application to Acoustical Pattern Recognition", *Biological Prototypes and Synthetic Systems*, vol. 1, pp. 192–212, Plenum, N.Y. (1962).

Mueller et al., "Neural Computation of Visual Images", *Proceedings of the First Annual International Conference on Neural Networks*, p. 1–14, Jun., 1987.

Mueller et al., "A Machine for Neural Computation of Acoustical Patterns with Application to Real Time Speech Recognition", *American Institute of Physics*, pp. 321–326, 1986.

*Primary Examiner*—Michael R. Fleming
*Assistant Examiner*—Michelle Doerrler
*Attorney, Agent, or Firm*—Woodcock Washburn Kurtz Mackiewicz & Norris

[57] ABSTRACT

A machine for neural computation of acoustical patterns for use in real-time speech recognition, comprising a plurality of analog electronic neurons connected for the analysis and recognition of acoustical patterns, including speech. Input to the neural net is provided from a set of bandpass filters which separate the input acoustical patterns into frequency ranges. The neural net itself is organized into two parts, the first for performing the real-time decomposition of the input patterns into their primitives of energy, space (frequency) and time relations, and the second for decoding the resulting set of primitives into known phonemes and diphones. During operation, the outputs of the individual bandpass filters are rectified and fed to sets of neurons in an opponent center-surround organization of synaptic connections ("on center" and "off center"). These units compute maxima and minima of energy at different frequencies. The next sets of neurons compute the temporal boundaries ("on" and "off"), while the following sets of neurons compute the movement of the energy maxima (formants) up or down the frequency axis. Then, in order to recognize speech sounds at the phoneme or diphone level, the set of primitives belonging to the phoneme is decoded such that only one neuron or a non-overlapping group of neurons fire when a particular sound pattern is present at the input. The output from these neurons is then fed to an Erasable Programmable Read Only Memory (EPROM) decoder and computer for displaying in real-time a phonetic representation of the speech input.

25 Claims, 7 Drawing Sheets

NEURAL NETWORKS FOR ACOUSTICAL PATTERN RECOGNITION

STATEMENT OF GOVERNMENT INTEREST

This invention was made with government support under contract N00014-87-K-0780 awarded by the Department of the Navy. The government has certain rights in the invention.

CROSS-REFERENCE TO RELATED APPLICATIONS

This application is a continuation-in-part application of U.S. patent application Ser. No. 07/428,455, filed Oct. 30, 1989, now abandoned, which is a continuation of U.S. patent application Ser. No. 07/128,321, filed Dec. 3, 1987, also now abandoned.

BACKGROUND OF THE INVENTION

1. Field of the Invention

The present invention relates to pattern recognition systems. More specifically, the present invention relates to an acoustical pattern recognition system implemented as a neural network which performs real-time decomposition of input patterns into their primitives of energy, space (frequency) and time relations and then decodes these primitives into phonemes or diphones which are recognized parts of speech.

2. Description of the Prior Art

Pattern recognition has been accomplished in various ways in the prior art. One of the best known methods of pattern recognition is typified by a simple radar system wherein a beam of electromagnetic energy illuminates a target and is backscattered to a receiver set which is coupled to a computer that analyzes the backscattered signal and forms an image of the target. Similarly, sonar systems accomplish the same result with acoustical type signals.

Regardless of the transmission and receiving apparatus used in these systems, a multi-purpose, digital computer is continually utilized to perform complex calculations to obtain an output which identifies the input signal. The types of computers used in the prior art to perform such calculations have been exclusively sequential machines that require sophisticated programming to effectively perform pattern recognition algorithms such as Fourier transforms, fast Fourier transforms and similar types of algorithms known to those with ordinary skill in the art.

A major drawback which exists with the use of digital, sequential computers in pattern recognition systems is the inherent limitation of these computers to perform their function in a strictly sequential fashion. It is known that sequential, digital computers perform one step of a process or algorithm over each machine cycle. In this manner, successive iterations are repeated over a large number of computer machine cycles of a complex algorithm in order to perform a pattern recognition function.

Depending upon the complexity of the algorithm, the digital computer must perform enormous numbers of machine cycles to form the complete solution of a complex algorithm. For example, when higher order differential equations must be solved simultaneously or when a large number of differential equations must be solved either simultaneously or sequentially, the number of machine cycles required to solve the equations increases drastically. With these drastic increases in machine cycles comes an increased time period for the digital, sequential computer to perform a complete analysis of incoming data. Those skilled in the art will appreciate that complete and useful pattern recognition with such digital computers can take hours or even days. Thus, the use of digital computers generally does not allow pattern recognition in "real-time."

There is therefore a long felt need in the pattern recognition art for a machine which can drastically reduce the time required to achieve pattern recognition. Some form of parallel processing of incoming signals would perform this function, and the use of a parallel processor or a machine capable of inherent parallelism could allow pattern recognition of a complex signal in real-time.

An additional problem which has existed in the pattern recognition art arises from the requirement that signals be resolved into digital components before they may be processed by a sequential, digital computer. This requires that all incoming signals be first "digitized" by an "analog to digital" component of the pattern recognition system before the digital computer can begin processing the signal with its particular pattern recognition algorithm. This places many burdens on prior art pattern recognition systems in that it requires expensive hardware to implement analog to digital conversion and increases the overall processing time of such systems by requiring the analog to digital conversion step. Thus, a pattern recognition system which utilizes incoming analog signals directly without analog to digital conversion is highly desirable.

Neural networks which are patterned after the intricate and sophisticated neural system of the brain are viewed in accordance with the present invention as providing an ideal model by which speedy parallel processing of analog signals can be accomplished for accurate pattern recognition. As known to those skilled in the art, neural networks are electronic networks which mimic the behavior of brain neurons and are appropriately interconnected to provide a desired processing function. As used herein, the term "neuron" is used without distinction for real neurons—those found in the brain—and for artificial neurons—those made from electronic components. It has been previously established that it is possible to construct artificial neurons which are, as far as input-output relations are concerned, complete analogs of the biological counterpart. Such technology is applied in accordance with the present invention for performing rapid processing of analog signals to provide an efficient pattern recognition technique.

The present inventor has previously established in a paper entitled "General Principles of Operation in Neuron Nets With Application to Acoustical Pattern Recognition", Mueller et al., *Biological Prototype and Synthetic Systems*, Vol. I, pp. 192–212, Plenum, New York (1962), that neurons may be used as logical devices to construct networks which perform logical operations for providing methods of quantitative calculations of input-output relations. In particular, as described therein, a neuron sees the output of its neighbors only up to integration at its synapse so that, as far as the individual neuron is concerned, there exist no input pulses. Its input and output are instead voltages which continue through varying periods of time and which are, within limits, continuously variable. Input pulses to the neurons may be integrated by an RC circuit of the synapse, whereby output pulses may be integrated at the synapse of a succeeding neuron. The input-output characteristics, normally mostly logarithmetic, also can be varied by positive or negative feedback from linearity to a complete step function Neurons thus function essentially as nonlinear amplifiers having a lower and upper bound and its characteristics can be controlled by external connections through feedback.

The output of neurons within a neural network can have a certain voltage, have a certain duration or occur at a certain time, and have an extension in space (i.e., involve a number of neurons) or occur at a certain place. Thus, there are only three variables or domains on which the system can operate, namely, energy, time and space. The basic operations on these variables are those of addition and subtraction in space or time (integration) and "if—then" type operations which are the consequence of the transmission of energy from one neuron to the next. As noted in the above-mentioned article, the discontinuity (quantization) in space or in the input-output characteristics (threshold) make logical operations of the Boolean type possible.

Mueller et al. further demonstrated in the above-mentioned article that networks of such neurons may be developed for acoustical pattern recognition using a transistorized neuron model. Such a network preferably comprises low output and input impedances to minimize sneak paths through the logic nets so as to allow many connections to each neuron. Preferably, integration and refractory time constants that are independent of the number and strength of the input connections to a neuron are also used. In addition, such circuits are designed to have stable thresholds which vary less than one percent. An artificial neuron of this type is disclosed therein. Mueller et al. further demonstrate that such artificial neurons may be used for the initial transformation of the auditory pattern to neural signals using a simulated cochlea and artificial neural networks. A sample neural network for acoustical pattern recognition is described which recognizes simple vowels and some consonants through the use of excitatory and inhibitory connections necessary for logical stability.

However, although the Mueller et al. article illustrates that it has long been known by the present inventor that neural nets may be used for general acoustical pattern recognition, the system described therein generally functions only to break the input acoustical patterns into a limited number of primitives which may or may not be recognized as certain vowel and consonants sounds. A more generalized system is desired which allows the primitives to be related to known phonemes and diphones which are known elements of speech which can be readily recognized when displayed. The present invention has been designed to meet this long-felt need.

SUMMARY OF THE INVENTION

The present inventor has met the above-mentioned needs in the art by designing a machine for neural computation of acoustical patterns for use in real-time speech recognition. For this purpose, a plurality of analog electronic neurons have been assembled into a neural net and connected for the analysis and recognition of acoustical patterns, including speech. Input to the neural net comes from a set of bandpass filters which separate the input acoustical patterns into frequency ranges. The neural net itself is organized into two parts. The first set of neurons performs the real-time decomposition of the input patterns into their primitives of energy, space (frequency) and time relations as described in the afore-mentioned paper, while the second set of neurons decodes the resulting set of primitives into known phonemes and diphones.

During operation, the output of the individual bandpass filters are rectified and fed to sets of neurons in an opponent center-surround organization of synaptic connections ("on center" and "off center"). These units compute maxima and minima of energy ($+d^2E/ds^2$) at different frequencies. The next sets of neurons preferably compute the temporal boundaries ("on" and "off") ($+dE/dt$), while the following sets of neurons compute the movement of the energy maxima (formants) up or down the frequency axis ($+ds/dt$). Then, in order to recognize speech sounds at the phoneme or diphone level, the set of primitives belonging to the phoneme is decoded in accordance with the invention such that only one neuron or a non-overlapping group of neurons fire when a particular sound pattern is present at the input. The output from these neurons is then fed to an EPROM decoder and computer for displaying in real-time a phonetic representation of the speech input.

Thus, the analysis of acoustical patterns in accordance with the present invention requires decoding of rapidly changing relations between energy, frequency and time variables. In particular, the present inventor has discovered that the analog and parallel computational methods used by neurons allow the simultaneous real-time evaluation of these relations and are therefore ideally suited for this task. The present invention is significant in that it provides a technique for real-time or even compressed time recognition of continuous speech at the phoneme level and is thus an extension of the technique of neural computation of acoustical patterns as described in the afore-mentioned article to Mueller et al.

A preferred embodiment of the present invention relates to a method of and apparatus for recognizing a pattern in a received signal. Preferably, the pattern recognition technique of the invention comprises the steps of or means for:

dividing the received signal into a plurality of frequency components;

determining primitives representing the respective differential relationships between energy, frequency and time characteristics of the plurality of frequency components using a first neural network comprising a plurality of interconnected electronic neurons; and decoding the primitives into predetermined patterns using a second neural network comprising a plurality of interconnected electronic neurons, whereby each respective neuron of the second neural network is connected to the first neural network so as to receive those primitives which make up its predetermined pattern and is activated when the primitives making up its predetermined pattern are received.

Preferably, the received signal is an acoustical signal and the predetermined patterns represent predetermined phonemes and diphones. Also, the primitive determining step preferably comprises the steps of determining a second derivative of energy with respect to frequency for each frequency component ($d^2E/ds^2$), determining a first derivative of energy with respect to time for each frequency component ($dE/dt$), and determining a first derivative of frequency with respect to time for each frequency component ($ds/dt$). In addition, the method of the invention preferably comprises the additional step of organizing the plurality of interconnected electronic neurons of the first neural network into a first group of electronic neurons for calculating $d^2E/ds^2$, a second group of electronic neurons for calculating $dE/dt$, and a third group of electronic neurons for calculating $ds/dt$, where each of the groups of electronic neurons are interconnected to each other. The method of the invention is also characterized by the further steps of translating the predetermined patterns from activated electronic neurons of the second neural network into symbols for display and displaying the symbols on a display in real time.

In accordance with another aspect of the invention, each of the electronic neurons of the invention comprises an input port, a positive output port, a negative output port, a plurality of operational amplifiers connected between the input and output ports, biasing means for biasing the plurality of operational amplifiers, and means connected to the positive and negative output ports for amplifying an output of the plurality of operational amplifiers such that at unity gain the input/output voltage relation of the electronic neuron is linear up to a maximum voltage and linear down to a minimum voltage. Preferably, each of the plurality of interconnected electronic neurons further comprises indicating means coupled to at least one of the positive and negative output ports to indicate whether the corresponding electronic neuron is on or off. In addition, the fan-out capability of each of the plurality of interconnected electronic neurons at unity transfer gain is preferably greater than five hundred. Also, the minimum and maximum voltages and the minimum outputs at the minimum and maximum voltages are preferably adjustable.

BRIEF DESCRIPTION OF THE DRAWINGS

The foregoing and other aspects and features of the invention herein described will be better understood from the following more detailed description and appended claims in conjunction with the drawings, of which:

DETAILED DESCRIPTION OF THE PRESENTLY PREFERRED EMBODIMENTS

Preferred embodiments of the invention will now be described with reference to FIGS. 1-6. It will be appreciated by those of ordinary skill in the art that the description given herein with respect to those figures is for exemplary purposes only and is not intended in any way to limit the scope of the invention. All questions regarding the scope of the invention may be resolved by referring to the appended claims.

Figure 1:
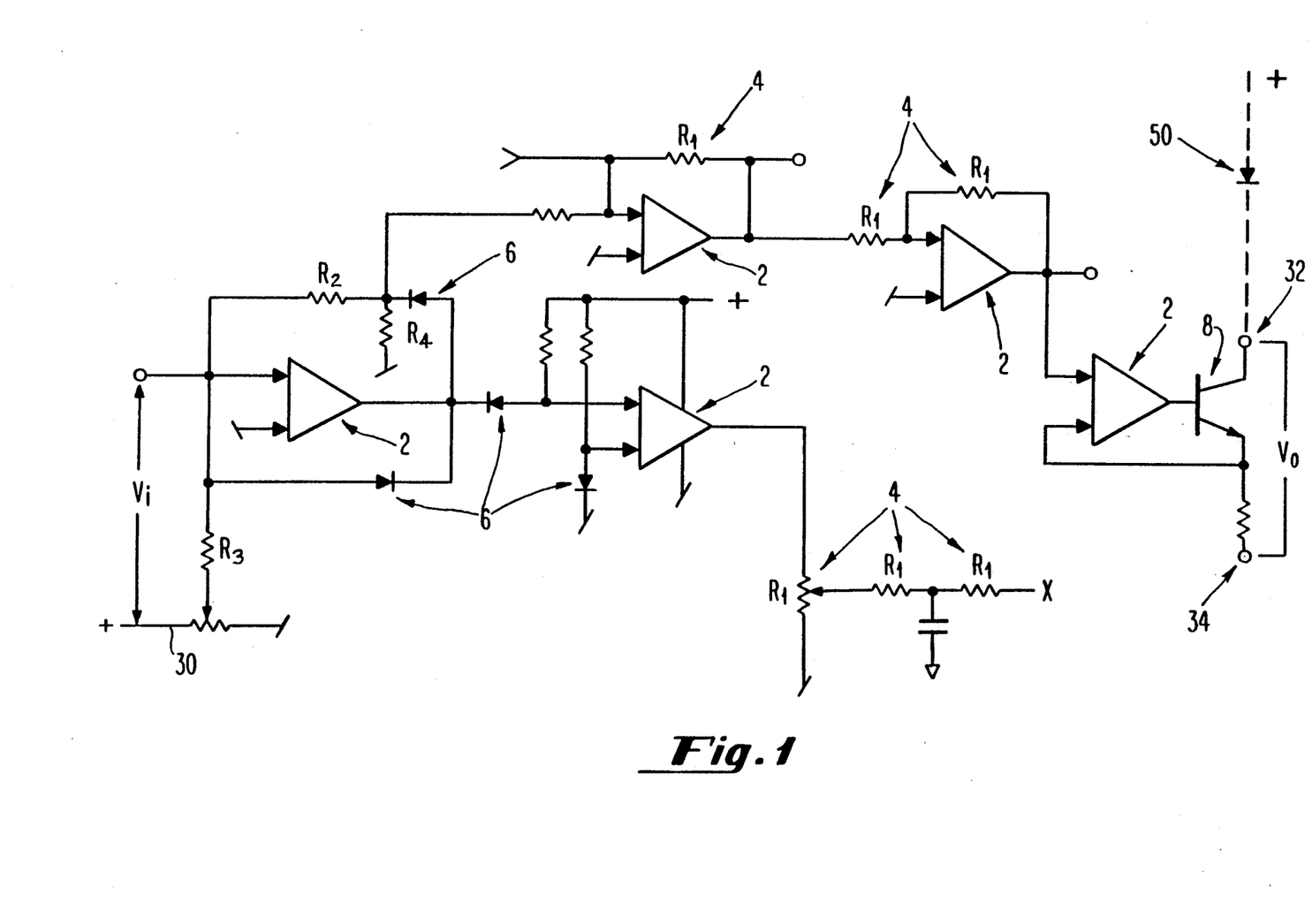
FIG. 1 illustrates a preferred embodiment of an electronic circuit which functions as a single neural element in a neural network in accordance with the invention.

FIG. 1 illustrates a circuit diagram of a preferred embodiment of an electronic neuron. As noted above, a neuron is a bi-stable element which has certain electronic characteristics which mimic the characteristics of a human brain neuron. In a preferred embodiment, the circuit is comprised of a plurality of operational amplifiers 2 such as TL084 operational amplifiers. Preferably, a plurality of resistive elements 4 are also provided for biasing the operational amplifiers 2, where the resistances $R_1$ preferably have values of approximately 100 Kohms; resistances $R_2$ preferably have values of approximately 150 Kohms and provide a high input resistance or impedance for the input voltage $V_1$; and resistances $R_3$ and $R_4$ preferably have respective values of approximately 15 Kohms and 10 Kohms and provide protection for the electronic neuron when coupled with diodes 6. An output amplifier such as transistor 8 provides amplification of output $V_0$, and a light emitting diode (LED) 50 may also be coupled to the respective positive and negative outputs 32 and 34 of the neural element. Thus, when the neuron "fires" or is turned on, LED 50 is "on". Similarly, when the neuron is not firing or is off, LED 50 is "off." A single summing input 30 with a fanout capability at unity transfer gain of greater than 500 to 1 is preferably also provided for each neuron. In addition, individually controlled synaptic gain and time constants are determined by individual resistors and capacitors in manners known by those skilled in the art. The threshold and minimum output at threshold preferably are also adjustable. Furthermore, when computation of the relationships involving the time dependent excitatory and inhibitory inputs are necessary, these inputs are preferably low pass (RC) coupled.

Figure 2A:
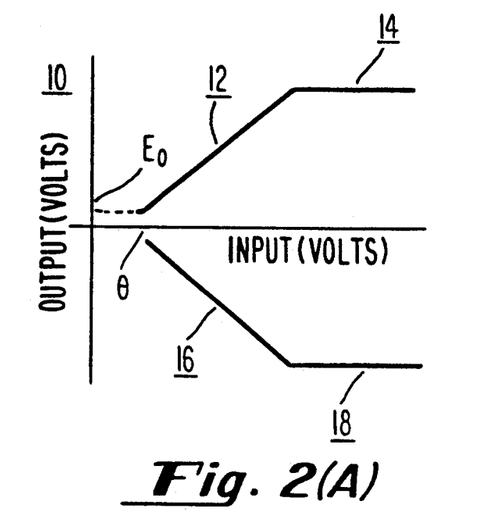
FIGS. 2(A)-2(D) illustrate the input/output characteristics of the electronic neuron of FIG. 1.

FIGS. 2(A)-2(D) show the steady state input/output relationship of the circuit shown in FIG. 1. In FIG. 2(A), the unity gain situation is shown at 10. It can be seen that the output has a threshold, $\theta$, and a minimum output at the threshold $\theta$ of $E_0$. Above the threshold $\theta$, the input/output relation is linear at 12 to some maximum 14. This is defined, as known by those with ordinary skill in the art, to be an "excitatory" output in that it is a positive output voltage which tends to turn a neural element "on." Additionally, the neural element has the characteristics, at the threshold $\theta$, also to be linear in the negative direction shown at 16 to some minimum 18. This is known by those with ordinary skill in the art as an "inhibitory" response in that it tends to subtract or turn "off" a neural element.

Figure 2B:
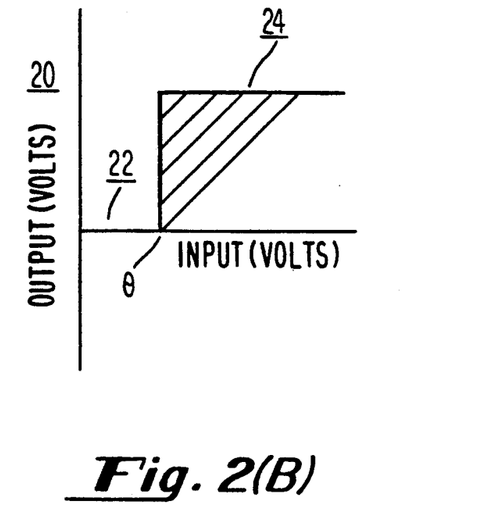

FIG. 2(B) illustrates that the minimum output at threshold, $E_0$, of the neural element can be internally controlled without affecting the threshold or the slope of the linear range. This is done by shifting the range value such that below $\theta$ the circuit is off (i.e., no output voltage) at 22 and above $\theta$ the circuit is "on" at 24 such that the output voltage is saturated. In this manner the circuit acts as a "Boolean" switch.

Figure 2C:
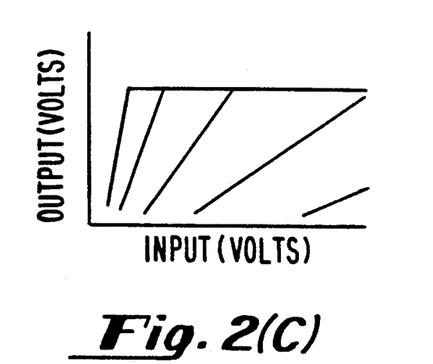

As shown in FIG. 2(C), by varying the "synaptic gain", the threshold $\theta$ and the slope of the linear range can be controlled. The synaptic gain, in preferred embodiments, is determined by the individual resistors and capacitors in the circuit which controls the rate at which the neural element attains the maximum (or minimum) output values.

Figure 2D:
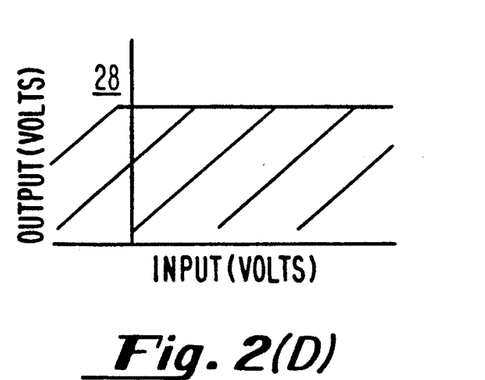

As shown in FIG. 2(D), by internally adjusting the circuit, such as by varying the values of the resistances 4 of the neuron shown in FIG. 1, the threshold $\theta$ can be forced into the negative region such that the element is "on" in the absence of an input.

Figure 3A:
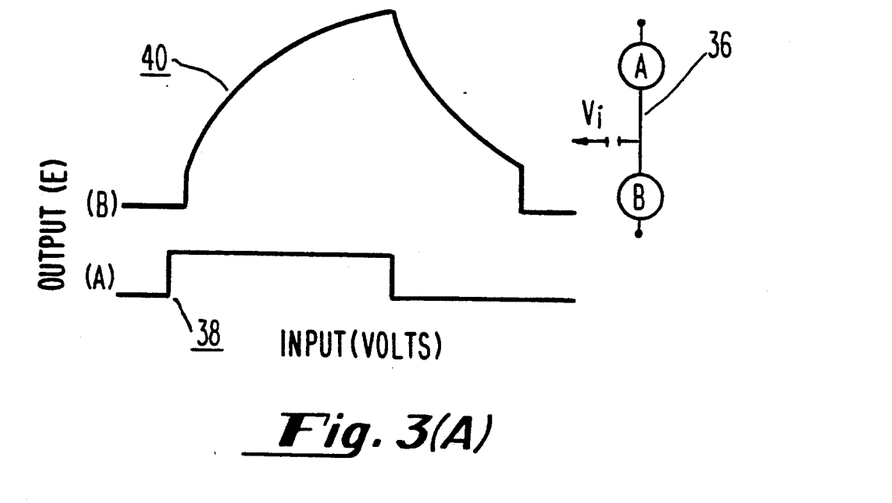
FIG. 3(A) exemplifies the response of a neuron B to a square wave output from a neuron A when low pass (RC) coupling of neuron A to neuron B produces an exponentially rising output in neuron B.

FIG. 3(A) illustrates a simple neural network 36 comprising two neurons A and B. Neuron A inputs a squarewave voltage 38 to neuron B. In response to the squarewave input voltage 38, neuron B may respond in an excitatory fashion so as to have a delayed and exponentially rising output 40 as shown. The non-linearity in the output of neuron B at the threshold $\theta$ is due to the minimum output at threshold, $E_0$.

Figure 3B:
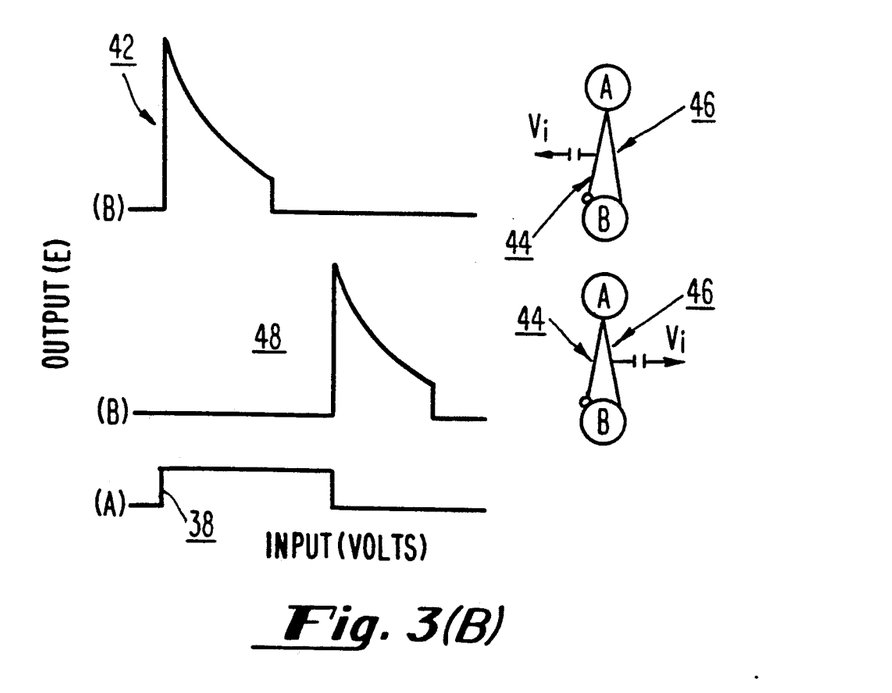
FIG. 3(B) exemplifies excitation and inhibition of the direct and low pass (RC) coupled neural net comprised of neurons A and B. In both cases a square wave is output from neuron A and input to neuron B wherein the top line typifies the "on response" and in the inverse arrangement of neurons A and B the bottom typifies an "off response".

FIG. 3(B) illustrates the response of the simple neural network 46 having direct and low pass coupled inputs is shown. An "on" response is generated in neuron B at 42 in response to certain combinations of direct and low pass coupled inhibitory inputs 44 and excitatory inputs 46 received from neuron A. Similarly, an "off" response 48 is generated for the inverse arrangement of inhibitory inputs 44 and excitatory inputs 46 from neuron A. In each case, the time from the beginning or end of the input is transformed into a potential. The simple neural networks which are shown in FIGS. 3(A) and 3(B) form the basic building blocks of a complex neural network which can be created by connecting a plurality of neurons together in manners generally known to those skilled in the art.

The exponentially decaying "on" and "off" responses shown in FIG. 3(B) generated from combinations of excitatory and inhibitory inputs to a neural element comprise the basic building blocks or "primitives" of a signal that is input to a neural network. In the presently preferred embodiment, an acoustical signal is input to a neural network having neurons which are electronically interconnected so as to permit each neuron to compute a certain set of primitives of the signal. For example, an input acoustical pattern can be broken down into its series of phonemes and diphones which, as known to those skilled in the art, are comprised of a combination of the relationships between energy, time and spatial frequency of the acoustical signal. Conveniently, neural networks, and in particular each neuron of a neural network, are able to compute the time and spatial derivatives of a signal's energy and also the time derivative of the spatial frequency such that the responses of the neurons are approximated by the outputs of the neurons, as described by the present inventor in the aforementioned article. Therefore, it is known that an acoustical signal may be broken down into its set of primitives using a neural network. However, it is desired to provide a further technique for analyzing the acoustical signal in terms of its primitives so as to allow real-time parallel processing of large amounts of input analog acoustical data. Such a technique will now be described with reference to FIGS. 4–6.

Figure 4:
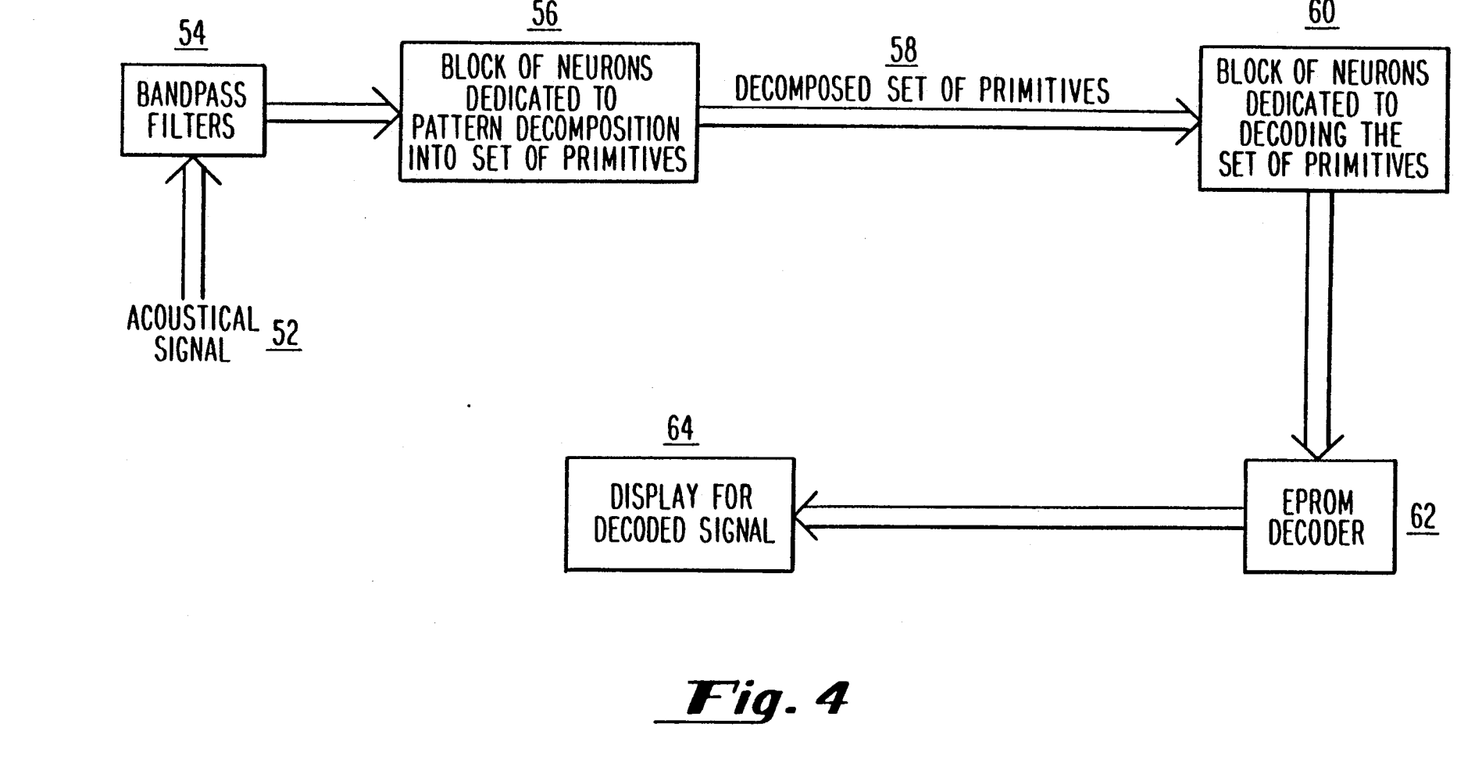
FIG. 4 illustrates a block diagram of a preferred embodiment of a neural network for pattern recognition in accordance with the invention.

FIG. 4 illustrates a preferred embodiment of a neural network for pattern recognition in accordance with the present invention. Although the illustrated neural network for pattern recognition is specifically designed to recognize acoustical patterns such as speech, those skilled in the art will appreciate that the design of the invention may be used to recognize other types of signal types as well, including radar, sonar, visual, astronomic signals and the like. As shown, acoustical signal 52 is initially input into a set of band-pass filters 54. Band-pass filters 54 preferably have a peak resonance factor $Q_{max}$ of 300 dB/octave and a log frequency scale of from 180 to 6,000 Hz. The band-pass filters 54 convert the frequency characteristics of input signal 52 into a spatial component related to the frequencies which are input to the neural network. The converted signal from band-pass filters 54 is then input into a first block of neural elements 56 which decompose the acoustical signal 52 into the unique set of primitives of the input acoustical signal 52. As noted in the aforementioned article by the present inventor, the acoustical signal can be divided by neural elements 56 into a set of primitives composed of the second derivative of its energy with respect to frequency ($d^2E/ds^2$), the first derivative of the energy with respect to time ($dE/dt$) and the first derivative of the signal frequency with respect to time ($ds/dt$). The differential relationships between energy, space, and time of an acoustical signal such as speech thus comprise the set of primitives of the signal. However, the analysis of acoustical patterns such as speech requires the further decoding of the rapidly changing relations between the energy, frequency and time variables of the signal into recognizable phonemes or diphones. The present inventor has discovered that the analog and parallel computational powers possessed by neural networks allow for simultaneous real-time evaluation of these relations. This aspect of the invention will be described in more detail below.

After the first set of neural elements 56 receives the acoustical signal 52 and decomposes the signal into its set of primitives 58, the decomposed set of primitives 58 is then input into the second block of neural elements 60 which then decodes the set of primitives 58. Each neuron in the second block of neural elements 60 is tuned to the presence of a particular phoneme or diphone so that when the set of primitives of a particular phoneme is present in the acoustical signal 52 a neuron in the second block of neural elements 60 tuned to that phoneme fires to indicate its existence. The diphones and phonemes are next translated into phonetic symbols by directing the output of the neural elements 60 into Erasable Read Only Memory (EPROM) decoder 62, where phonemes and the like recognizable by a viewer may be accessed. EPROM decoder 62 is further coupled to display 64 which is preferably comprised of a display monitor and a general multi-purpose digital computer. In this fashion, the phonetic content of the processed acoustical signal 52 is output on display 64 in phonetic form. Display 64 could be any of a number of output devices as would be appreciated by those skilled in the art. Such devices include, but are not limited to, a typewriter, a computer, a television screen, a tape recording device or any type of bulk storage memory device.

Figure 5:
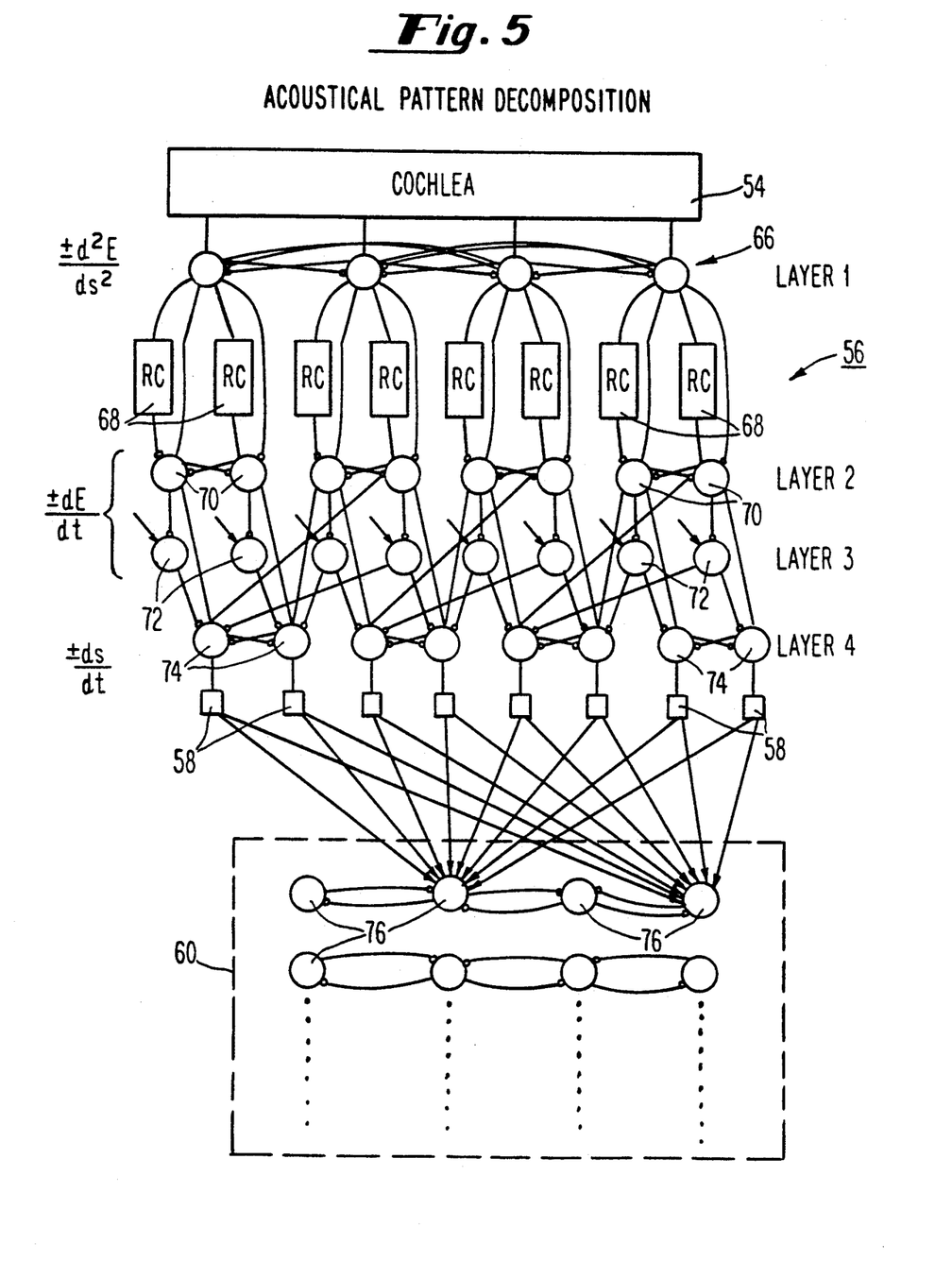
FIG. 5 illustrates in more detail an exemplary neural network for decomposing an acoustical signal in terms of its energy, space and time components and for decoding the resulting primitives into phonemes and diphones.

FIG. 5 illustrates in more detail an embodiment of the invention of FIG. 4 whereby acoustical patterns may be decomposed into primitives which are functions of energy, space (frequency) and time. As shown, the analog input signals to the first neural network 56 come from a bank of high Q bandpass filters ($Q_{max}=300$ dB/octave), with characteristics similar to those found in the cochlea of the ear. Hence, the bandpass filters 54 are labeled as a cochlea in FIG. 5. In the embodiment illustrated in FIG. 5, eight bandpass filters were used with center frequencies of 400 Hz, 600 Hz, 750 Hz, 900 Hz, 1100 Hz, 1700 Hz, 2500 Hz and 4000 Hz for a log frequency scale of 180 Hz to 6000 Hz. The primary neurons 66 in layer 1 receive rectified outputs from these bandpass filters 54. As illustrated, neurons 66 in layer 1 are designed to be mutually inhibiting in a center-surround fashion with spatially decaying gains which is typical of biological sensory input stages. The neurons 66 of layer 1 are also tuned to extract the maxima of the sound amplitude at particular sound frequencies. In particular, "on center" units receive excitatory inputs from a center filter and inhibitory connections from the surrounding filters with gains that decrease logarithmically from the center. Together with the "off center" neurons, which have the inverse organization of the "on center" units, $+d^2E/ds^2$ is computed as the maxima and minima of energy in the frequency space.

The outputs of neurons 66 of layer 1 are then provided as excitatory inputs to "on" neurons 70 in layer 2, and inhibitory inputs delayed through RC elements 68 are also provided to the "on" neurons 70 in layer 2. The "on" units of layer 2 also receive undelayed inhibitory inputs from the surrounding "off" units 70 of layer 2. Similarly, the "off" units 70 of layer 2 receive inhibitory inputs directly from the neurons 66 of layer 1 and delayed excitatory inputs which have passed through low pass filter (RC) elements 68 as well as undelayed inhibitory inputs from the surrounding "on" units. The "off" units 72 in layer 3 are thus the complements of the "on" units of layer 2, whereby the "off" units and their complement are next to the "on" units in layers 2 and 3, respectively. The "off" neurons are connected in a similar fashion as the "on" neurons except that they receive complementary delayed inputs from the first stage neurons. Thus, the "on" and "off" neurons are mutually inhibiting and function to compute in essence local temporal rise and decay (dE/dt) of the sound amplitudes. The layer 3 neurons may be normally "on" as a result of a positive bias input at the arrows and may compute the complement of the activity of the second stage neurons. Finally, neural elements 74 in layer 4 compute changes in frequency maxima and their direction (local rise and fall of frequency—ds/dt) through a combination of outputs of neurons of levels 2 and 3 as shown (hence functioning as motion detectors). Outputs of the neural elements 74 are then provided as the decomposed set of primitives 58.

Changes in formant frequency which represent local movement of the energy maxima along the frequency axis in either direction (+ds/dt) are preferably computed by neural "and gating" of neighboring "on" and "off" units as described in the aforementioned article. Thus, neural network 56 comprises a plurality of neurons whose activity is normally high and is suppressed by the activity in the "on" or "off" units. In addition, there is a set of "on center" neurons responding exclusively to low energy sounds, while another set of "hyperacuity" neurons may also be provided for expanding the frequency resolution. Similarly, another set of "on center" neurons may be used which respond only to sounds with durations less than 80 ms. The resulting signals are then output to the second neuron net 60 for pattern decoding.

The second set of neurons 60 comprises a plurality of neurons 76 which each receive all of the outputs from the first block of neurons 56. Each neuron 76 is thus tuned to a particular acoustical pattern or phoneme and generates a specific pattern of activity in the second set of neurons 60. Mutual inhibitory connections between decoding neurons 76 are used to suppress activity in neurons tuned to phonemes other than the current one. Each neuron 76 in the second block of neuron 60 also has synaptic connections from the first block of neurons 56 which are tuned to a different phoneme by appropriately setting the synaptic weights and gains. The synaptic weight and gains to the respective neurons 76 of the second block of neuron 60 may be computed, for example, by taking particular time segments of the outputs from the respective neurons of the first block of neurons 56 and storing them after A/D conversion in a digital computer which computes the decoding connections for time slices using global decoding strategies.

In accordance with the global decoding strategies of the invention, generally all inputs from the decomposing neurons of the first block of neurons 56 to the decoding neurons 76 of the second block of neurons 60 are positively weighted by the probability of a primitive being a member of the set active during an average phoneme as well as by their average output amplitude divided by the sum of all outputs. Non-member and weak member neurons (neurons whose output is on average below 10% of maximal) are inhibitory and weighted by their "distance" from the set boundaries. All "off" units that become active at the end of the phoneme or during transition to another phoneme are considered to be inhibitory with gains determined by their average amplitude. In addition, those complement units ("on" units) used for motion detection which are blocked during a phoneme are also considered to be inhibitory.

Figure 6A:
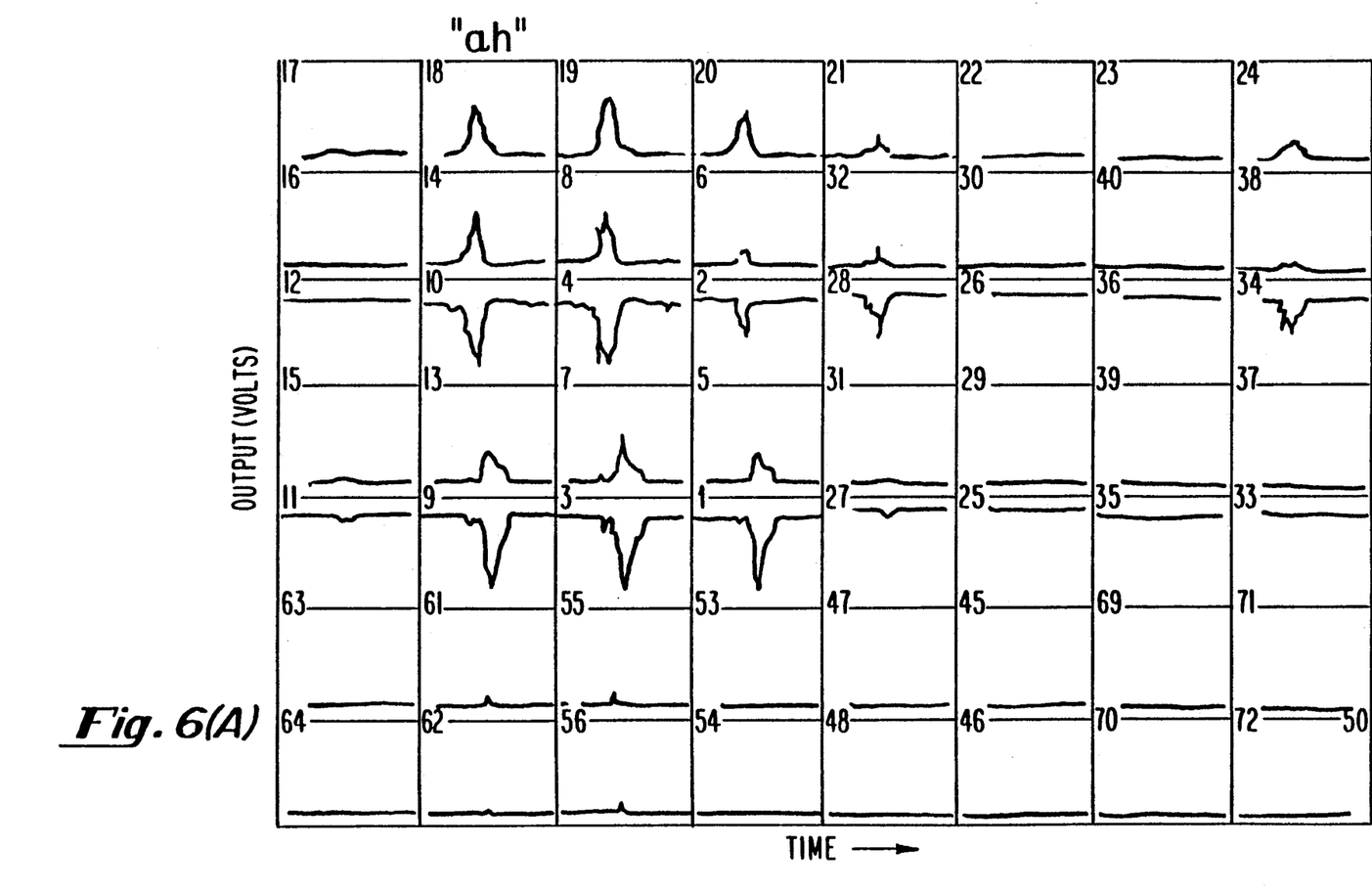
FIG. 6(A) illustrates the outputs of 56 neurons for the primary decomposition of an "ah" sound in accordance with the invention.
Figure 6B:
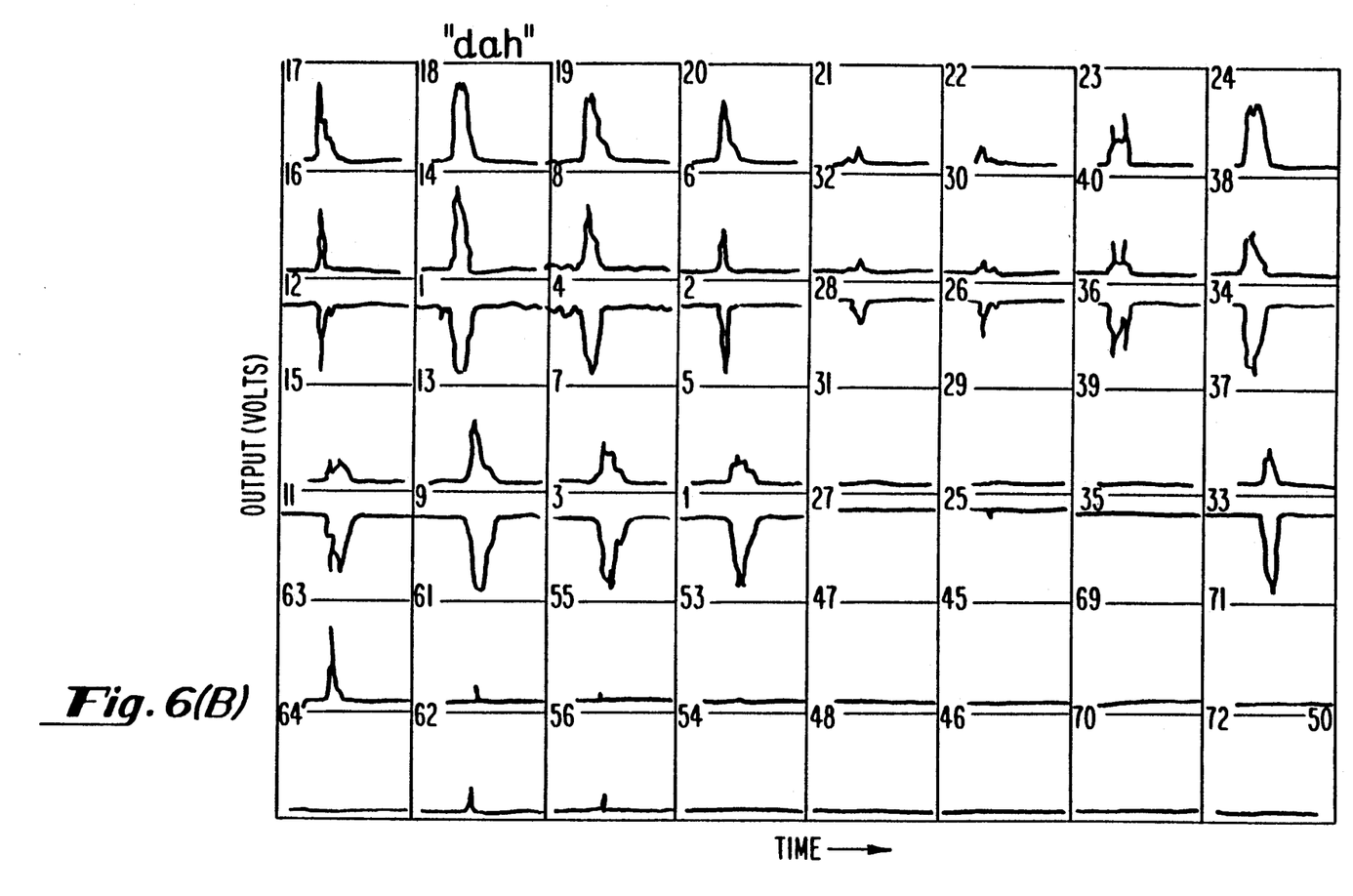
FIG. 6(B) illustrates the outputs of 56 neurons for the primary decomposition of a "dah" sound in accordance with the invention.

The expected performance of the second block of neurons 60 may be evaluated by computing the outputs from the decoding neurons 76 for different phonemes. An example of this computation for 56 neurons is illustrated in FIGS. 6(A) and 6(B). The waveforms illustrated in FIGS. 6(A) and 6(B) were generated and recorded in real-time for a period of 1000 msec for the primary decomposition of the two phonemes "ah" (FIG. 6(A)) and the diphone "dah" (FIG. 6(B)). FIGS. 6(A) and 6(B) illustrate the differences in these patterns as the output of each neuron 76 as a function of time during pronunciation of the phoneme. The columns represent increasing frequency from left to right (from 200 to 3000 Hz), and the activity of the neurons in the first row is proportional to the sound energy at the different frequencies. The second and fourth rows represent the positive and negative rate of change of the sound amplitude at the different frequencies, while the third and fifth rows are the complement of rows two and four. The outputs of neurons in rows five and six represent up and down changes of frequency as a function of time as they occur, for example, in diphones during formant transitions. Such a transition is indicated by the activity of neuron #63 in the pattern for "dah" (FIG. 6(B)), where the "dah" sound shows a formant transition at the lower frequencies which is absent in the "ah" sound illustrated in FIG. 6(A). Thus, the neural network of the invention easily keeps up with the spoken word and decomposes the sound into its primitives in real-time and can use these outputs as input to a pattern recognition circuit for recognition of individual phonemes.

Using the values of the synaptic gains computed in the above-mentioned fashion, the physical connections to a set of more than 50 decoding neurons 76 may be made by plugging individual resistors into a large cross point ray of miniature connectors. In addition to the decoding connections described above, all decoding neurons 76, each tuned to a different phoneme or diphone, may be mutually inhibited with a gain factor of 0.9 which assures that only one unit is active at any time during a phoneme (winner take all). Output from the decoding neurons may then be provided to EPROM decoder 62 for coding the active neuron into its proper phonetic symbol which is then displayed on display 64.

The speed advantage over digital simulations for such a simple neural network in accordance with the invention is impressive. Comparison of the network performance with simulations show that a digital computer with a processing speed of at least $10^{11}$ Flops is required to match the real-time performance of such a neural network. Thus, the present invention results in drastic improvement in computational power for the decomposition of an input signal for pattern recognition purposes.

It will be appreciated by those skilled in the art that neural networks exhibit massive parallelism in processing because of the large number of connections in the neuron net whereby each neuron is connected to many other neurons. Those skilled in the art will also appreciate that a robust system is also achieved since if one neuron ceases to function its loss is minimized by the number of interconnections to the other neurons.

Those skilled in the art also will readily appreciate that many modifications to the invention are possible within the scope of the invention. For example, different neuron designs may be used provided that a sufficient number of inputs and outputs may be supported. Accordingly, the scope of the invention is not intended to be limited to the preferred embodiments described above, but only by the appended claims.

What is claimed is:

1. A method of recognizing a pattern in a received signal, comprising the steps of:
   dividing said received signal into a plurality of frequency components;
   determining primitives representing the respective differential relationships between energy, frequency and time characteristics of said plurality of frequency components using a first neural network comprising a plurality of interconnected electronic neurons; and
   decoding said primitives into predetermined patterns using a second neural network comprising a plurality of interconnected electronic neurons, whereby each respective neuron of said second neural network is connected to said first neural network so as to receive those primitives which make up said respective neuron's predetermined pattern and is activated when said primitives making up said respective neuron's predetermined pattern are received.

2. The method of claim 1, wherein said received signal is an acoustical signal and said predetermined patterns represent predetermined phonemes and diphones.

3. The method of claim 2, wherein said primitive determining step comprises the steps of determining a second derivative of energy with respect to frequency for each frequency component ($d^2E/ds^2$), determining a first derivative of energy with respect to time for each frequency component (dE/dt), and determining a first derivative of frequency with respect to time for each frequency component (ds/dt).

4. The method of claim 3, comprising the further step of organizing said plurality of interconnected electronic neurons of said first neural network into a first group of electronic neurons for calculating $d^2E/ds^2$, a second group of electronic neurons for calculating dE/dt, and a third group of electronic neurons for calculating ds/dt, each of said groups of electronic neurons being interconnected to each other.

5. The method of claim 1, comprising the further steps of:
   translating the predetermined patterns from activated electronic neurons of said second neural network into symbols for display; and
   displaying said symbols on a display in real time.

6. A pattern recognition system for recognizing a pattern in a received signal, comprising:
   means for dividing said received signal into a plurality of frequency components;
   a first neural network comprising a plurality of interconnected electronic neurons for determining primitives representing the respective differential relationships between energy, frequency and time characteristics of said plurality of frequency components; and
   a second neural network comprising a plurality of interconnected electronic neurons for decoding said primitives into predetermined patterns, whereby each respective neuron of said second neural network is connected to said first neural network so as to receive those primitives which make up said respective neuron's predetermined pattern and is activated when said primitives making up said respective neuron's predetermined pattern are received.

7. The system of claim 6, wherein said received signal is an acoustical signal and said predetermined patterns represent predetermined phonemes and diphones.

8. The system of claim 7, wherein said first neural network determines a second derivative of energy with respect to frequency for each frequency component ($d^2E/ds^2$), a first derivative of energy with respect to time for each frequency component (dE/dt), and a first derivative of frequency with respect to time for each frequency component (ds/dt).

9. The system of claim 8, wherein said plurality of interconnected electronic neurons of said first neural network are organized into a first group of electronic neurons for calculating $d^2E/ds^2$, a second group of electronic neurons for calculating dE/dt, and a third group of electronic neurons for calculating ds/dt, each of said groups of electronic neurons being interconnected to each other.

10. The system of claim 6, further comprising means for translating the predetermined patterns from activated electronic neurons of said second neural network into symbols for display and means for displaying said symbols in real time.

11. The system of claim 10, wherein said translating means comprises an erasable programmable read only memory (EPROM) decoder coupled to an output side of said second neural network.

12. The system of claim 6, wherein said dividing means comprises a set of bandpass filters for dividing said received signal into said plurality of frequency components.

13. The system of claim 6, wherein each of said plurality of interconnected electronic neurons comprises:
an input port;
a positive output port;
a negative output port;
a plurality of operational amplifiers connected between said input and output ports;
biasing means for biasing said plurality of operational amplifiers; and
means connected to said positive and negative output ports for amplifying an output of said plurality of operational amplifiers such that at unity gain the input/output voltage relation of the electronic neuron is linear up to a maximum voltage and linear down to a minimum voltage.

14. The system of claim 13, wherein each of said plurality of interconnected electronic neurons further comprises indicating means coupled to at least one of said positive and negative output ports to indicate whether the corresponding electronic neuron is on or off.

15. The system of claim 13, wherein the fan-out capability of each of said plurality of interconnected electronic neurons at unity transfer gain is greater than five hundred.

16. The system of claim 13, wherein said minimum and said maximum voltages and the minimum outputs at said minimum and maximum voltages are adjustable.

17. An acoustical pattern recognition system for recognizing a pattern in a received acoustical signal, comprising:
a set of bandpass filters for dividing said received acoustical signal into a plurality of frequency components;
a first neural network comprising a plurality of interconnected electronic neurons for determining primitives representing the respective differential relationships between energy, frequency and time characteristics of said plurality of frequency components; and
a second neural network comprising a plurality of interconnected electronic neurons for decoding said primitives into phonemes and diphones, whereby each respective neuron of said second neural network is connected to said first neural network so as to receive those primitives which make up a particular phoneme which is defined by the phoneme's set of primitives, each electronic neuron being activated when said electronic neuron's phoneme is present in said received acoustical signal.

18. The system of claim 17, wherein said first neural network determines a second derivative of energy with respect to frequency for each frequency component ($d^2E/ds^2$), a first derivative of energy with respect to time for each frequency component ($dE/dt$), and a first derivative of frequency with respect to time for each frequency component ($ds/dt$).

19. The system of claim 18, wherein said plurality of interconnected electronic neurons of said first neural network are organized into a first group of electronic neurons for calculating $d^2E/ds^2$, a second group of electronic neurons for calculating $dE/dt$, and a third group of electronic neurons for calculating $ds/dt$, each of said groups of electronic neurons being interconnected to each other.

20. The system of claim 17, further comprising means for translating the phonemes and diphones from activated electronic neurons of said second neural network into phonetic symbols for display and means for displaying said phonetic symbols in real time.

21. The system of claim 20, wherein said translating means comprises an erasable programmable read only memory (EPROM) decoder coupled to an output side of said second neural network.

22. An electronic neuron comprising:
an input port;
a positive output port;
a negative output port;
a plurality of operational amplifiers connected between said input and output ports;
biasing means for biasing said plurality of operational amplifiers; and
means connected to said positive and negative output ports for amplifying an output of said plurality of operational amplifiers such that at unity gain the input/output voltage relation of the electronic neuron is linear up to a maximum voltage and linear down to a minimum voltage.

23. The neuron of claim 22, wherein each of said plurality of interconnected electronic neurons further comprises indicating means coupled to at least one of said positive and negative output ports to indicate whether the corresponding electronic neuron is on or off.

24. The neuron of claim 22, wherein the fan-out capability of each of said plurality of interconnected electronic neurons at unity transfer gain is greater than five hundred.

25. The neuron of claim 22, wherein said minimum and said maximum voltages and the minimum outputs at said minimum and maximum voltages are adjustable.

* * * * *